Oct. 24, 1939.  C. A. DE GIERS  2,177,058
HYDRAULIC TRANSMISSION SYSTEM
Filed May 21, 1937  3 Sheets-Sheet 1

Clarence A. de Giers
INVENTOR
BY
Cooper, Kerr & Dunham
ATTORNEYS

Oct. 24, 1939.　　　C. A. DE GIERS　　　2,177,058
HYDRAULIC TRANSMISSION SYSTEM
Filed May 21, 1937　　　3 Sheets-Sheet 3

Patented Oct. 24, 1939

2,177,058

UNITED STATES PATENT OFFICE 2,177,058

HYDRAULIC TRANSMISSION SYSTEM

Clarence A. de Giers, Long Island City, N. Y., assignor to The Liquidometer Corporation, Long Island City, N. Y., a corporation of Delaware Application May 21, 1937, Serial No. 143,950

3 Claims. (Cl. 73—317)

This invention pertains to hydraulic transmission systems of the kind used in remote control indicators.

An object of the invention is to disclose improvements which render such systems more durable, more easily repaired, and generally more satisfactory in service.

The invention is illustrated and described as applied to the tank-end portion of apparatus for indicating the level of fuel oil in the tanks of a submarine. Such service is very severe and trouble has been caused by electrolytic and chemical action on the device. This is particularly true when the apparatus works in salt water, especially if the instrument is exposed alternately to air and water or oil and water. Although such deterioration is slow, it is, nevertheless objectionable since it may cause too frequent overhauling and replacement of parts.

In the particular embodiment of the invention under consideration the tank-end portion of the system comprises a pair of float-controlled Sylphons arranged for actuating, hydraulically, a remote device for indicating the amount of liquid in the tank.

To largely overcome the objection as to deterioration, the present structure has been devised, in which the delicate transmitting Sylphons are protected in a hermetically sealed enclosure which may, if desired, be filled with fluid such as a good grade of light oil, the result being that the Sylphons are protected from fluids and the impurities found therein.

In order to carry the mechanical motion from the float into the enclosure to actuate the transmitting Sylphons a flexible seal in the form of a third Sylphon of heavy gauge metal is used in such manner that it can be readily replaced. This third comparatively heavy Sylphon is exposed for easy inspection and when it shows too much deterioration it can readily be replaced at comparatively slight expense. With this arrangement the comparatively delicate, light gauge, transmitting Sylphons are completely isolated from the tank contents, and tank pressure, and since the sealing Sylphon can be of heavy gauge metal the tank-end unit may be used in a tank containing much higher pressure than would be the case if the heavy sealing Sylphon were not used.

Further and other objects and advantages will be apparent from the specification and claims, and from the accompanying drawings which illustrate what are now considered preferred embodiments of the invention.

Figure 1:
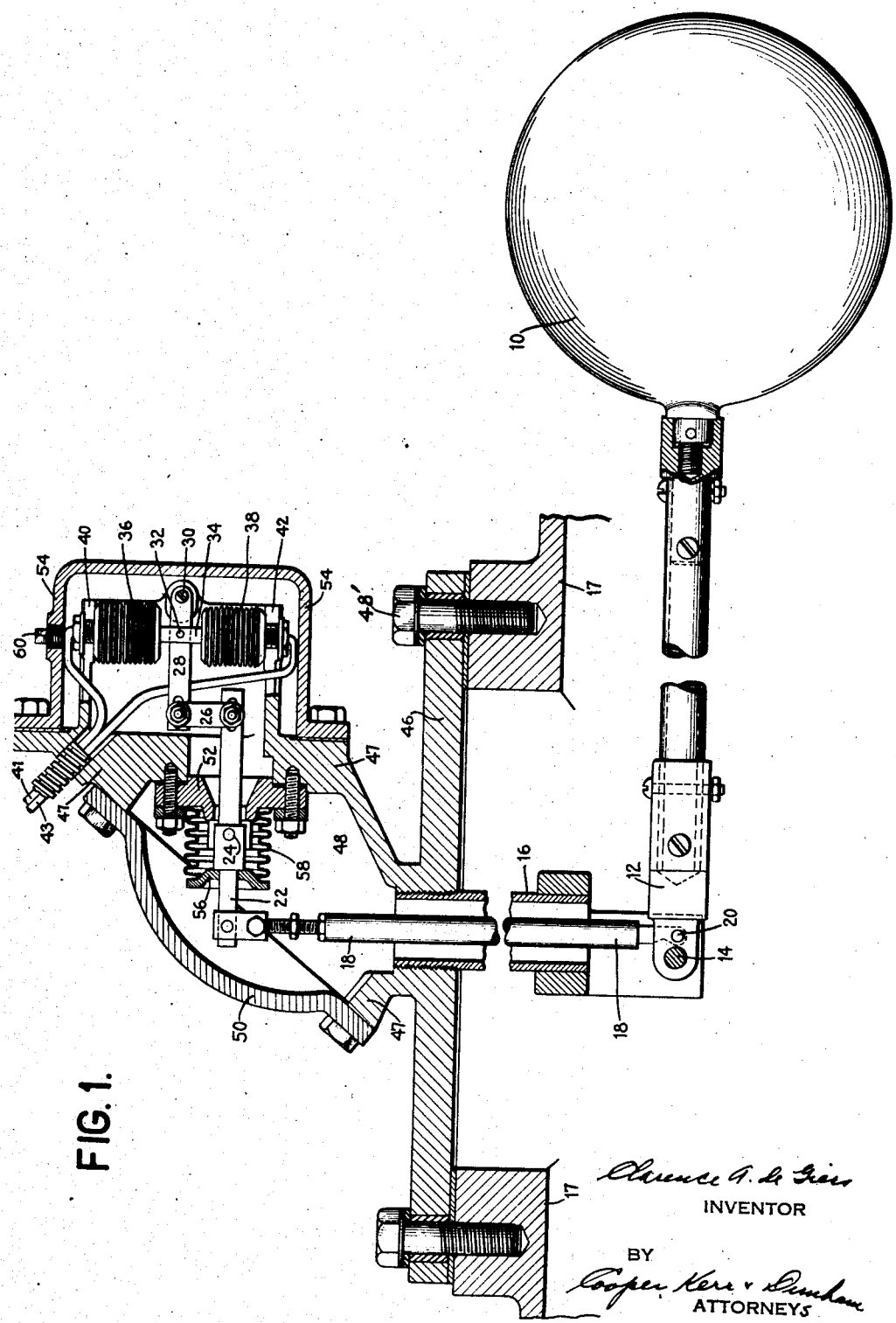
Fig. 1 is a view of an embodiment of the invention suitable for location above a tank.

Referring to Fig. 1, 10 is the float mounted on arm 12 fulcrumed at 14 on a bracket on the lower end of tubular support 16 extending downwardly into tank 17. A link 18 connected at 20 to float arm 12 passes upwardly in tube 16 and is attached at its upper end through a suitable fitting to horizontal lever 22 pivoted at 24. The other end of lever 22 is connected by link 26 to lever 28 fulcrumed at 30. A pivot pin 32 connects lever 28 through rod 34 to the lower and upper free ends of Sylphons 36 and 38, respectively, the upper and lower ends of which are fixed to supporting brackets 40 and 42, respectively.

As float 10 moves vertically to follow changes of level of liquid in the tank, the above described lever system moves rod 34 vertically to expand one Sylphon and contract the other in order to control a remote indicator by the flow of liquid forced through tubes 41, 43 as the Sylphons to which the tubes are connected expand or contract.

The above mechanism is supported on plate 46 secured by bolts 46' over an opening in tank 17. Mounted on plate 46 and integral therewith is a shell 47 forming a chamber 48 provided with a cover plate 50. Within chamber 48 is a plate 52 attached to shell 47 and supporting pivot 24. Sylphon supporting brackets 40, 42 are attached to shell 47, and the Sylphons are enclosed by a cover 54.

Fixed on lever 22 in chamber 48 is a disc 56 to which is sealed one end of a Sylphon 58, its other end being sealed to plate 52. Sylphon 58 flexes when lever 22 rocks about pivot 24 and serves as a seal to prevent passage of fluid from the tank through chamber 48 into the chamber enclosing the transmitting Sylphons 36, 38. Suitable packing hermetically seals all other joints of the Sylphon chamber, and the comparatively delicate transmission Sylphons are therefore protected against deterioration. The Sylphon chamber may, if desired, be filled with a suitable oil or other fluid through the opening normally closed by plug 60. Sylphon 58 is exposed to fluid from the tank, but due to the nature of the function performed by that Sylphon, it may be made of comparatively heavy metal and therefore resists corrosion for a long period of time. When Sylphon 58 must finally be replaced it is only necessary to remove cover 50 and install a new unit comprising plate 52 with a lever 22 and Sylphon 58 attached, thus making the apparatus again as good as new.

Figure 2:
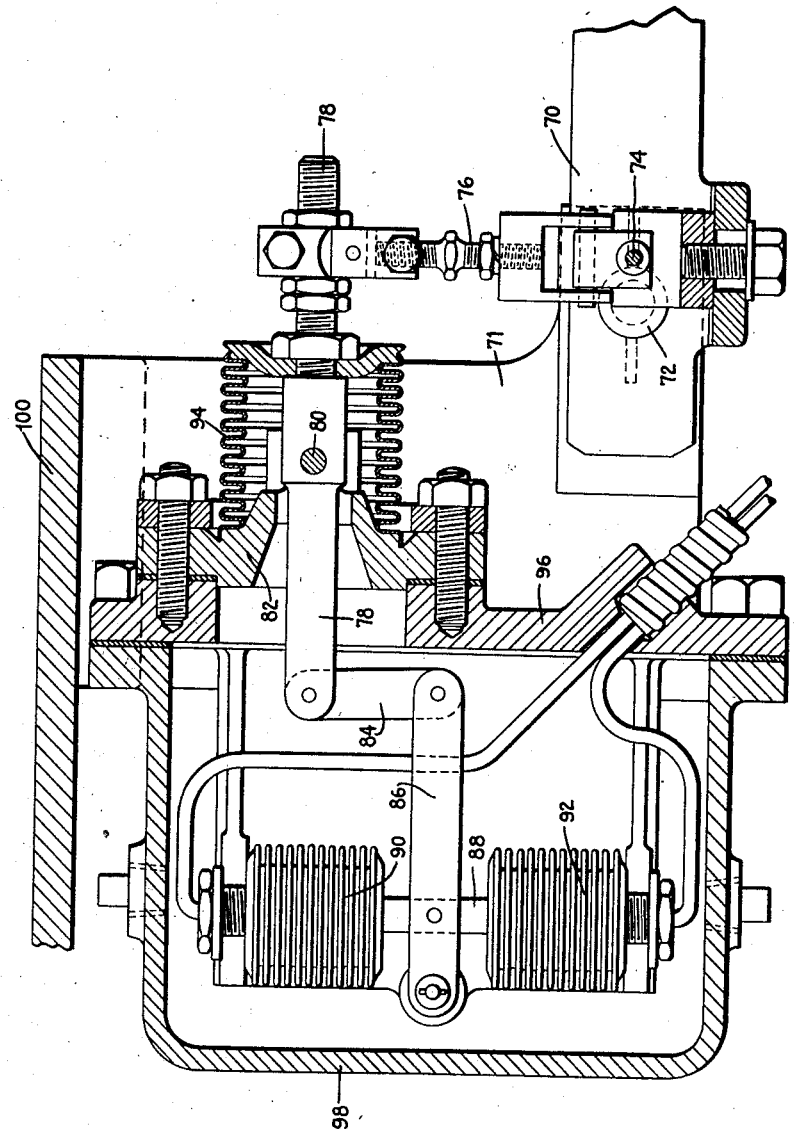
Fig. 2 is a view of a tank end unit adapted to be placed within a tank.

Fig. 2 shows an embodiment of the invention suitable for installation inside the tank in direct contact with the liquids and gases therein. In Fig. 2, 70 is the float arm pivoted on frame bracket 71 at 72, and connected at 74 by a vertical link 76 to horizontal lever 78 pivoted at 80 on plate 82 and operatively connected through link 84, lever 86 and rod 88 to the two transmitting Sylphons 90 and 92. Heavy Sylphon 94 functions exactly as does Sylphon 58 above described.

Sylphons 90, 92, are hermetically sealed in a chamber formed by wall 96, cover plate 98, and Sylphon 94, while the parts outside of that chamber are exposed to the contents of the tank.

The device is provided with a supporting flange 100 integral with wall 96 and frame 71. Link 76 is provided with suitable adjusting devices of known type.

Figure 3:
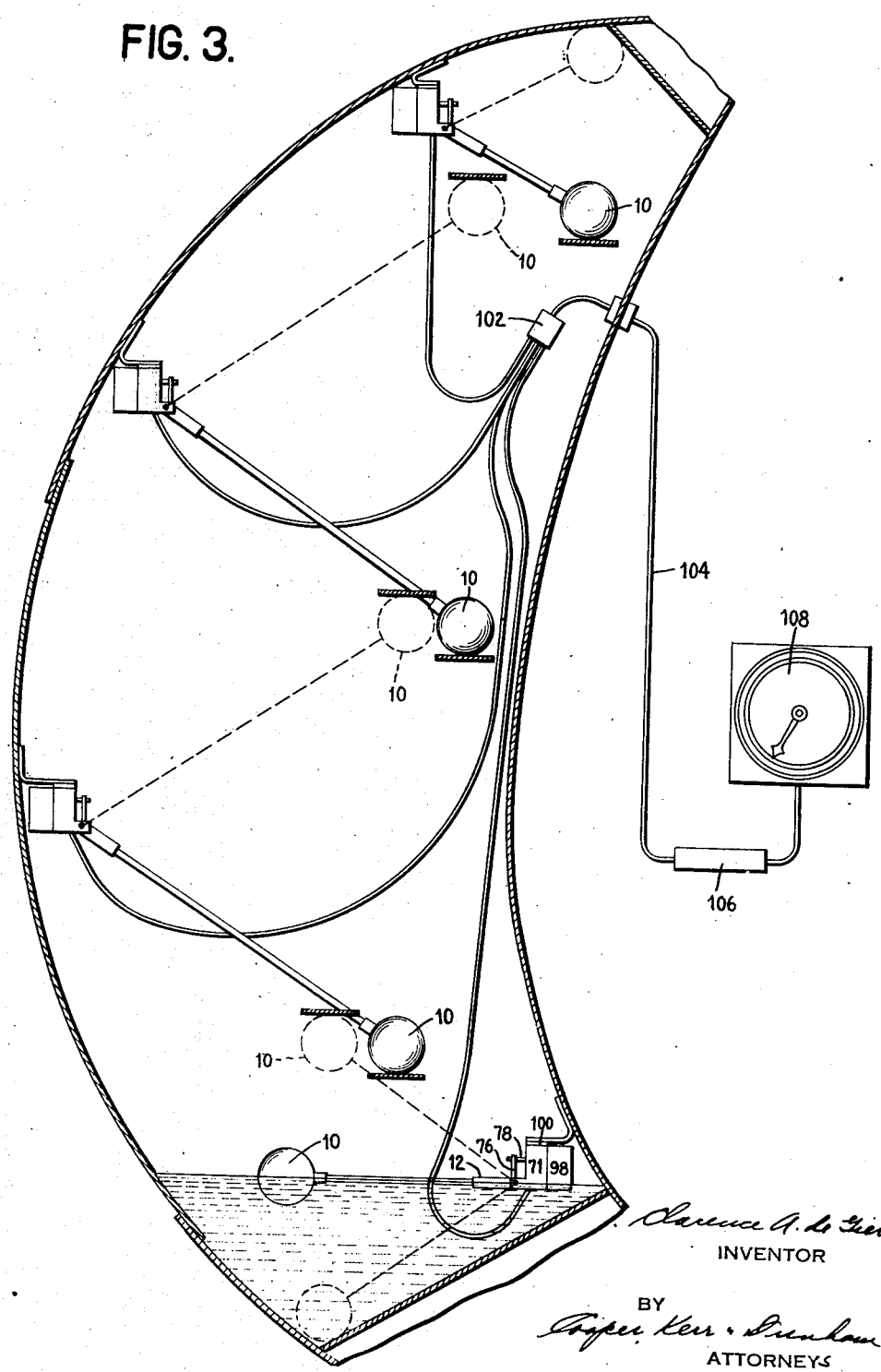
Fig. 3 is a diagrammatic view of a series of tank end units of the type illustrated in Fig. 2 and placed one above the other in a submarine tank and arranged to indicate the tank contents on a single indicator.

Fig. 3 is a section of a fuel tank in a submarine, comprising the space between the outer and inner surfaces of the boat. The shape of this tank does not permit the installation of a single transmitting unit for the purpose of gauging the tank's contents, and therefore several units are employed. The units illustrated are of the type shown in Fig. 2. The floats are arranged so that as the tank fills and each float reaches its upper limit of travel, the float next above it begins to move upwardly from its position of rest. As the tank is emptied, the reverse movement of the floats takes place. The motion transmitting tubes from all the units lead to a junction box 102 and from that point transmission tubes 104 extend through the temperature compensating unit 106 to indicator 108.

It is to be understood that the invention is not limited to the specific embodiment herein illustrated and described, but may be used in other ways without departure from its spirit as defined by the following claims.

I claim:

1. In apparatus of the class described for measuring the liquid level within tanks, in combination, a float adapted for movement by change of level of liquid in a tank, a Sylphon-motion-transmitting unit within the tank intermediate the maximum and minimum liquid level, a chamber enclosing the Sylphon unit independent of the tank, means comprising a Sylphon for hermetically sealing said chamber and its unit from the tank contents, means passing through said Sylphon operatively interconnecting said float to said unit whereby movement of said float controls said unit, and a remote device controlled by said unit for indicating the level of the liquid.

2. The invention set forth in claim 1 in which said first mentioned Sylphon is of lighter gauge metal than said second mentioned Sylphon.

3. In apparatus of the class described for measuring the liquid level within tanks, in combination, a float adapted for movement by change of level of liquid in a tank, a Sylphon-motion-transmitting unit within the tank intermediate the maximum and minimum liquid levels, a chamber enclosing the Sylphon unit independent of the tank, means comprising a Sylphon for hermetically sealing said unit within said chamber and from the tank contents, means operatively interconnecting said float to said unit whereby movement of said float controls said unit, means whereby the hermetically sealed chamber may be filled with oil to further protect said Sylphon-motion-transmitting unit, and a remote device controlled by said unit for indicating the level of the liquid.

CLARENCE A. DE GIERS.